United States Patent [19]

Sakurai et al.

[11] Patent Number: 5,149,023
[45] Date of Patent: Sep. 22, 1992

[54] MECHANICALLY-LINKED SIDE STICK CONTROLLERS WITH ISOLATED PITCH AND ROLL CONTROL MOVEMENT

[75] Inventors: Seiya Sakurai, Seattle; Dieter W. Hoener, Bellevue; Erwin V. Schweizer, Kent, all of Wash.

[73] Assignee: The Boeing Company, Seattle, Wash.

[21] Appl. No.: 730,271

[22] Filed: Jul. 12, 1991

[51] Int. Cl.$^5$ .............................................. B64C 13/12
[52] U.S. Cl. ................................... 244/229; 244/234; 244/236; 74/471 XY
[58] Field of Search ............... 244/234, 236, 237, 220, 244/230, 229; 74/471 R, 471 XY, 473

[56] References Cited

U.S. PATENT DOCUMENTS

| | | | |
|---|---|---|---|
| 2,373,575 | 4/1945 | Lemonier | 244/234 |
| 2,396,309 | 3/1946 | Wodal | 74/471 XY |
| 2,760,739 | 8/1956 | Reichert | 244/236 |
| 2,877,600 | 3/1959 | Rush | 74/471 R |
| 3,409,252 | 11/1968 | Miller | 244/234 |
| 3,768,328 | 10/1973 | Campbell | 74/471 XY |
| 4,062,508 | 12/1977 | Stephens et al. | 244/234 |

FOREIGN PATENT DOCUMENTS 245266  7/1947  Switzerland .......................... 244/234

Primary Examiner—Galen Barefoot
Attorney, Agent, or Firm—Glenn D. Bellamy

[57] ABSTRACT

Side stick controllers with isolated pitch and roll control movement may be mechanically linked. A control stick mechanism includes a hand-operated control member (10, 10') movable to swing about two axes of rotation (12, 14). A first lever member (16, 16') on the control member (10, 10') moves in response to swinging movement of the control member (10, 10') about a first axis of rotation (12). A reciprocating member (20) has a first portion (22) pivotally attached to the control member (10, 10') at a location (24) spaced from the second axis of rotation (14). The reciprocating member (20) has an elongated second portion (26) axially movable along a line of reciprocation substantially co-axial with the first axis of rotation (12) in response to swinging movement of the control member (10, 10') about the second axis of rotation (14). Movement of the first lever member (16, 16') effects operation of a first control sensor (44, 46) and movement of the reciprocating member (20) effects operation of a second control sensor (40, 42).

2 Claims, 11 Drawing Sheets

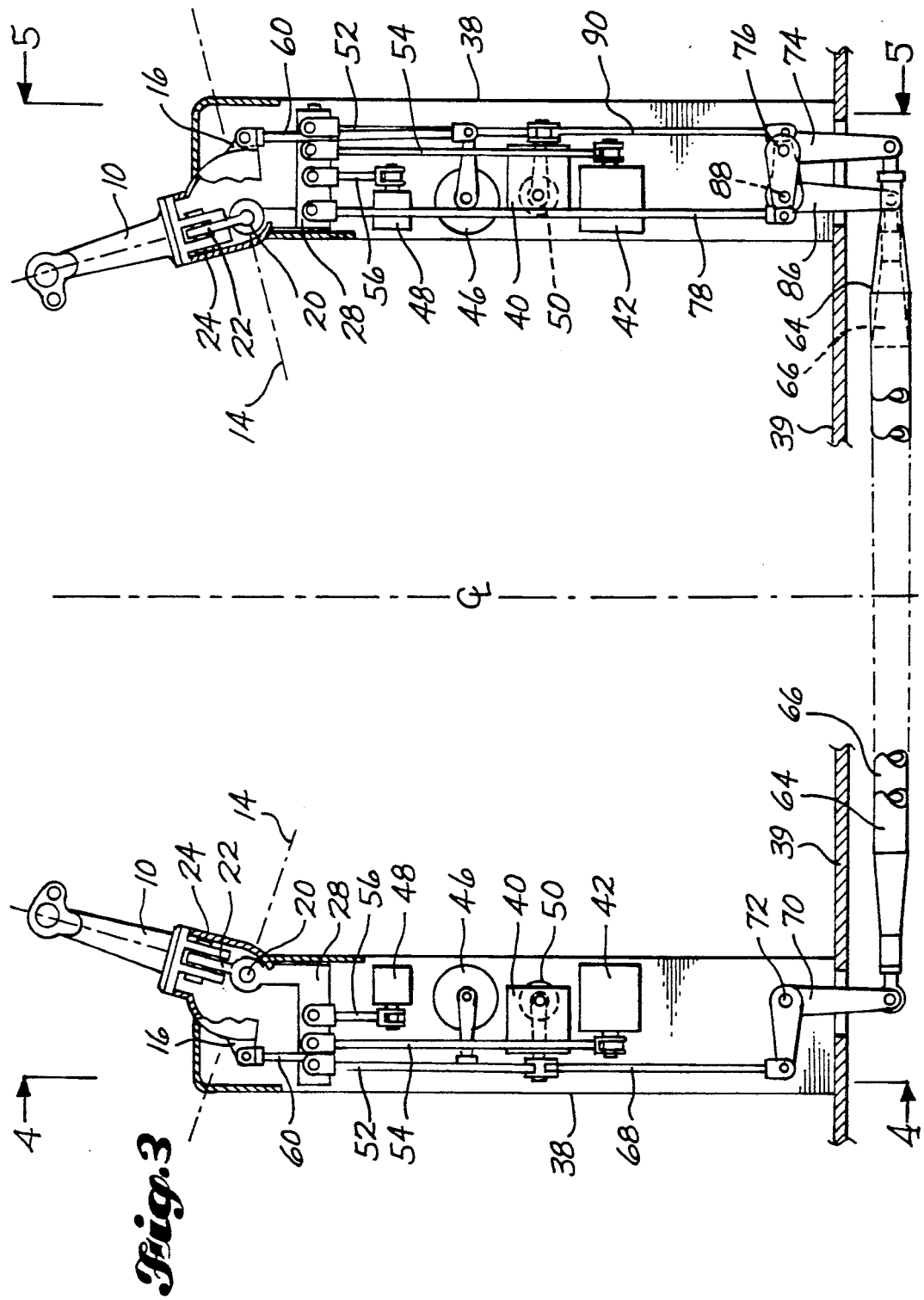

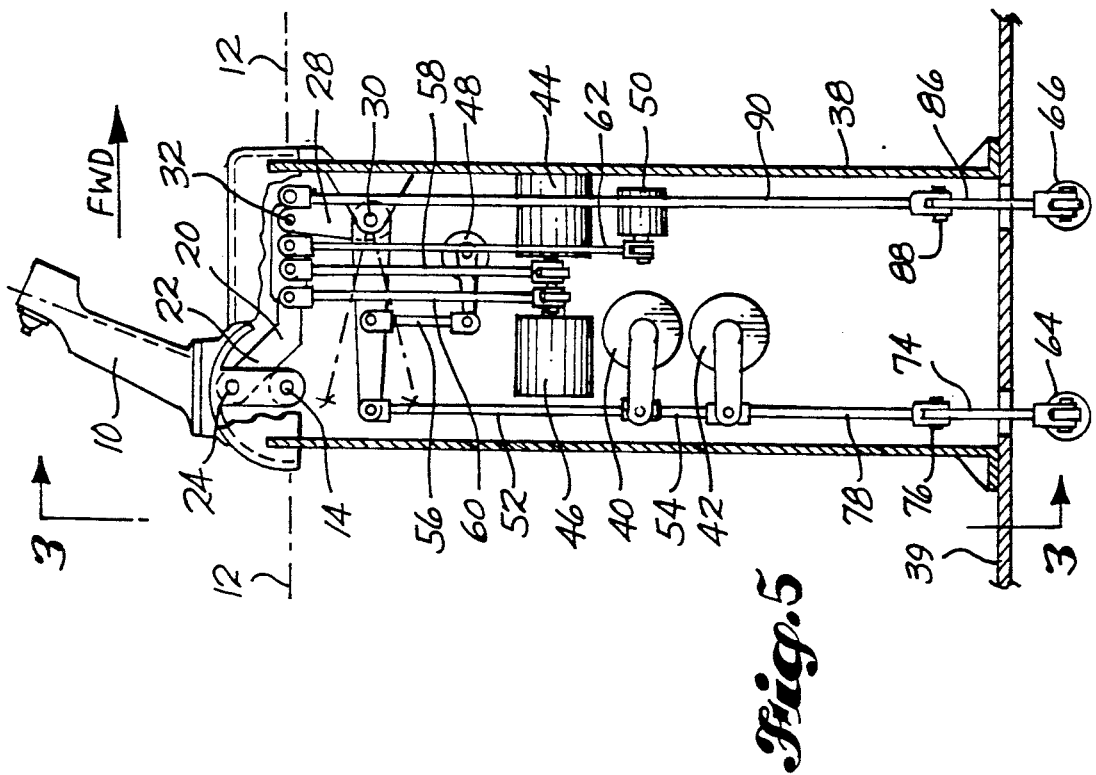
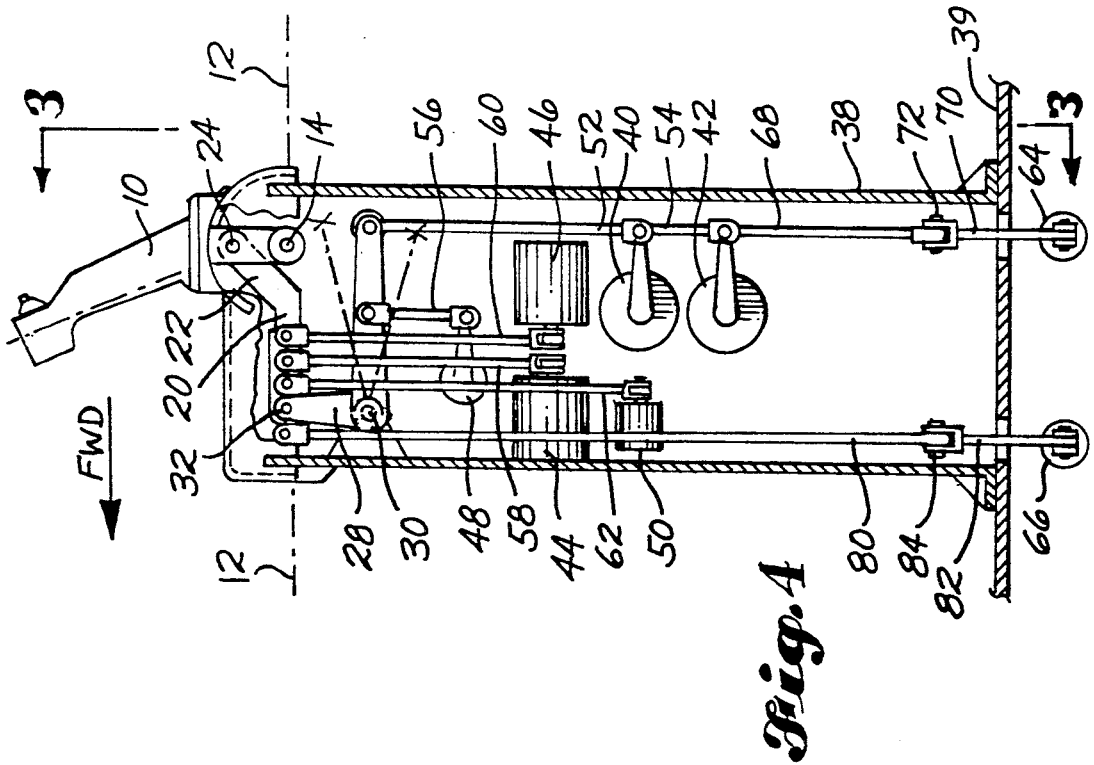

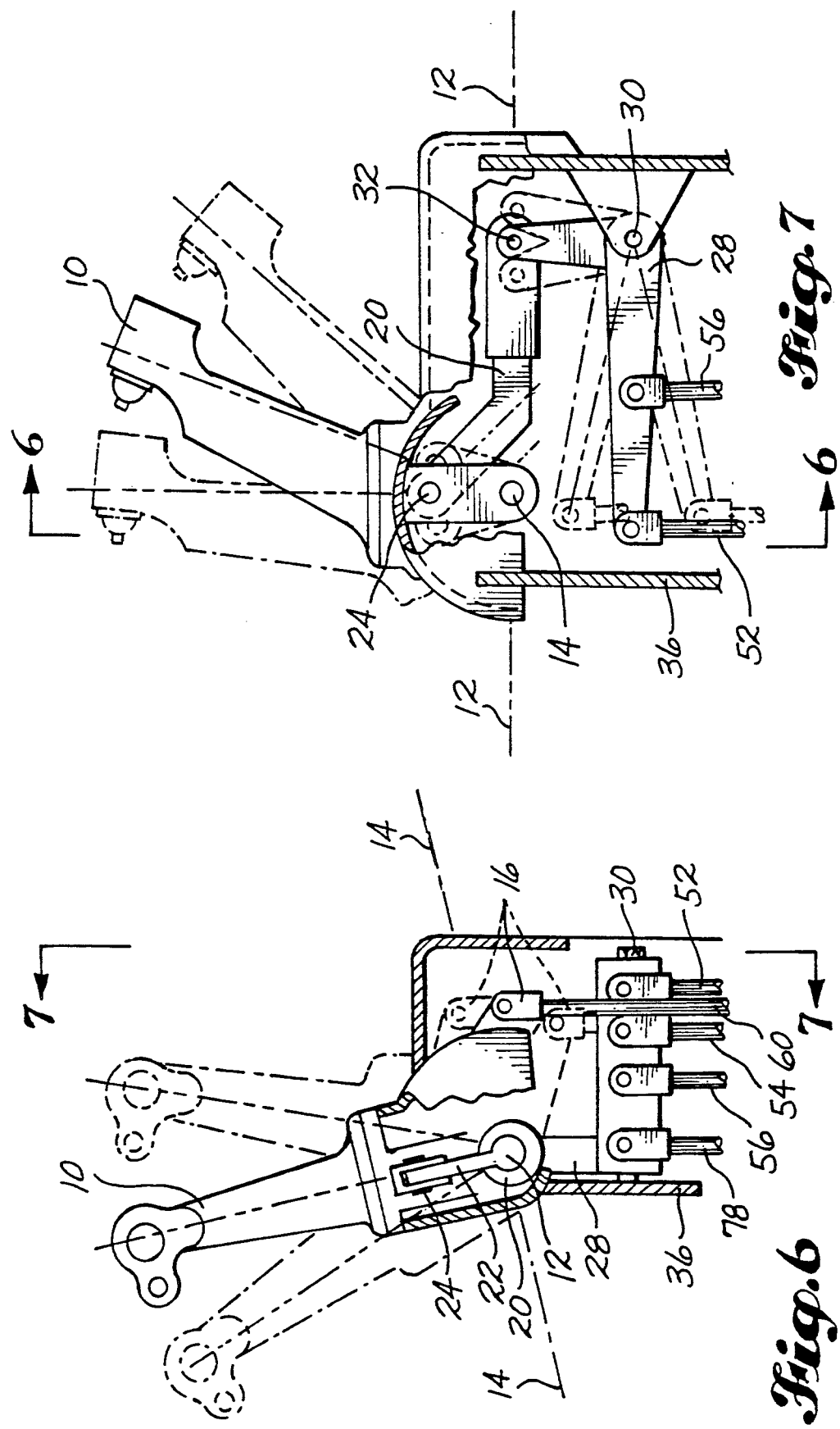

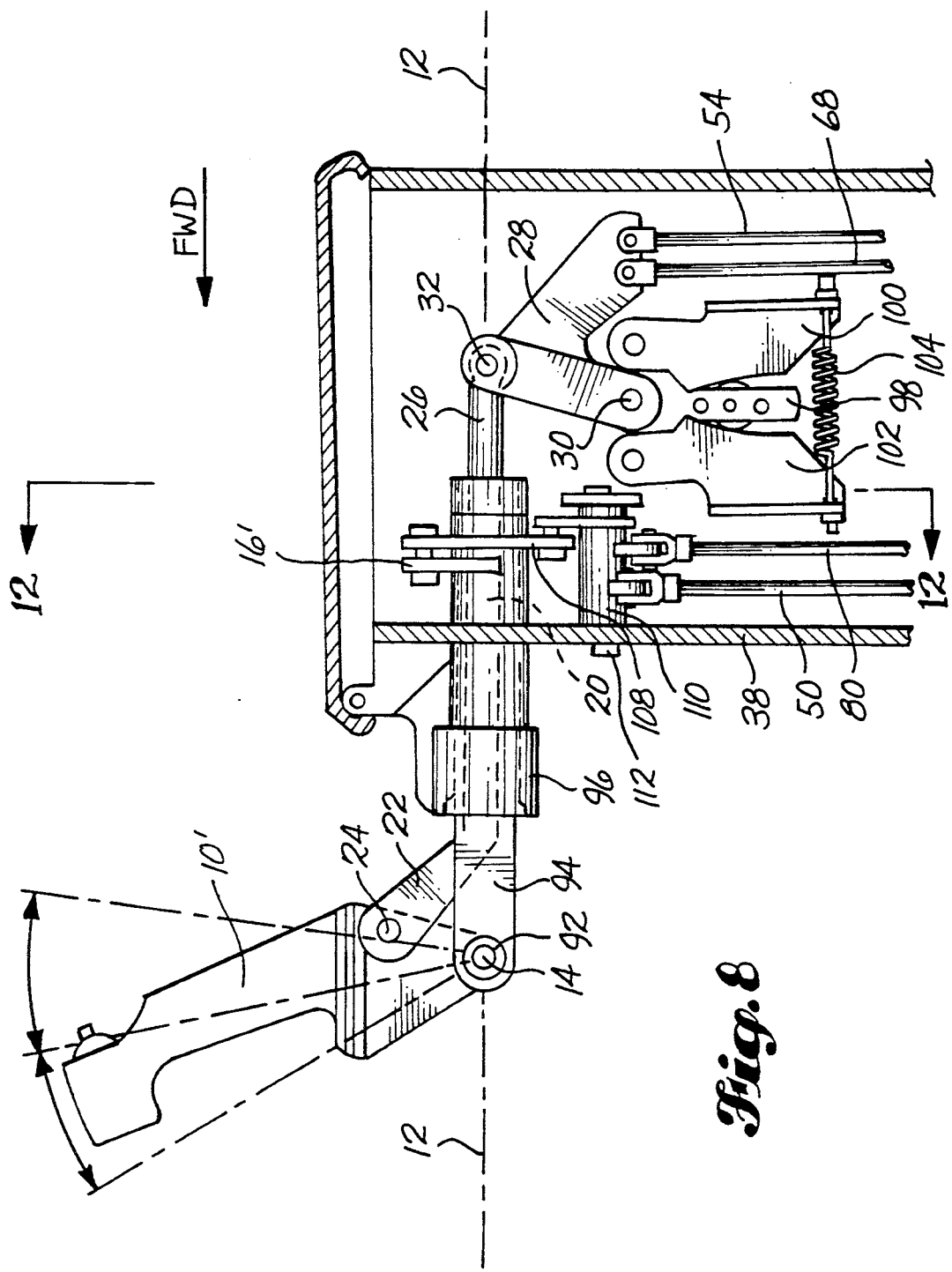

MECHANICALLY-LINKED SIDE STICK CONTROLLERS WITH ISOLATED PITCH AND ROLL CONTROL MOVEMENT

DESCRIPTION

1. Technical Field

This invention relates to side stick controllers for operation of aircraft control surfaces and, primarily, for those systems known as "fly-by-wire." This invention is particularly directed to such a stick controller which may be mechanically-linked to another controller and provide isolation between pitch and roll control movement such that movement in one axis will not require compensatory adjustment in the other axis.

2. Background of the Invention

Control of a powered aircraft has commonly been achieved through the use of a multi-axis, centrally-located control stick operated by the pilot. Movement of the control stick is translated to the aircraft's movable control surfaces by either a purely mechanical, or a combined mechanical/hydraulic actuator system. Controls of this type are broadly known as a mechanical or power operated aircraft control system.

More recently, the purely mechanical and the mechanical/hydraulic systems in commercial aircraft have been replaced by multi-axis controllers in which electrical signals, initiated by movement of the pilot-operated stick, are transmitted electrically or electronically to the remote air foil. An associated hydraulic valve and actuator are controlled by the electrical signal. This type of system is commonly referred to as "fly-by-wire." Since there is no direct mechanical connection between the control surface and the controller, this type of system isolates, from the pilot, the feel provided by the resistance of the air foil to movement from its neutral position.

Another problem results from the fact that commonly two such controller sticks, one for the pilot and one for the copilot, are provided and both are electronically linked to the control surface actuation means. Previously, the pilot and copilot were each electronically provided with a visual indicator representing movement of the other's controller stick. This would require a visual perception which had to be translated into a representative physical movement and, in turn, responded to or compensated for by physical movement of the other operator's controller stick.

To partially overcome this problem, the controller sticks could be mechanically linked together to provide a tactile stimulus or indicator of control stick manipulation being performed by the other operator. However because each stick controller includes electrical position sensors, it becomes critical that movement of each control stick in each axis is isolated from and does not cause movement, resulting in undesired sensor input, in the other axis. Prior attempts to accomplish this isolation of input movement between the axes have required large, complicated and cumbersome mechanics in the controller, ultimately preventing the simultaneous mechanical linking of a pair of such controllers.

SUMMARY OF THE INVENTION

The present invention provides a control stick mechanism having a hand-operated control member movable to swing about two axes of rotation. The control member includes a first lever member which moves in response to swinging movement of the control member about the first axis of rotation. A reciprocating member having a first portion pivotally attached to the control member at a location spaced from the second axis of rotation has an elongated second portion longitudinally movable along a line of reciprocation substantially coaxial with said first axis of rotation in response to swinging movement of the control member about the second axis of rotation. Movement of the first lever member effects operation of a first control sensor. Movement of the reciprocating member effects operation of a second control sensor. The control stick mechanism of the present invention may be used either in an aircraft or a flight simulator.

A pair of such controllers may be mechanically linked together to provide tactile/visual feedback to one operator of the other's control input movements.

The present invention may be more fully understood by examination of the drawings and following description of the best mode for carrying out the invention, all of which constitute disclosure of the present invention.

BRIEF DESCRIPTION OF THE DRAWINGS

Like reference numerals are used to indicate like parts throughout the various figures of the drawing, wherein:

FIG. 3 is a rear plan view of left and right mechanically-linked side stick controllers according to the first embodiment of the invention;

FIG. 4 is a cut-away side view taken substantially along line 4—4 of FIG. 3;

FIG. 5 is a partially cut-away side view taken substantially along line 5—5 of FIG. 3;

FIG. 6 is an enlarged detail rear view of the stick controller taken substantially along line 6—6 of FIG. 7;

FIG. 7 is an enlarged detail side view of the stick controller taken substantially along line 7—7 of FIG. 6;

FIG. 8 is an enlarged detail side view of the stick controller according to the second embodiment of the invention;

BEST MODE FOR CARRYING OUT THE INVENTION

Figure 1:
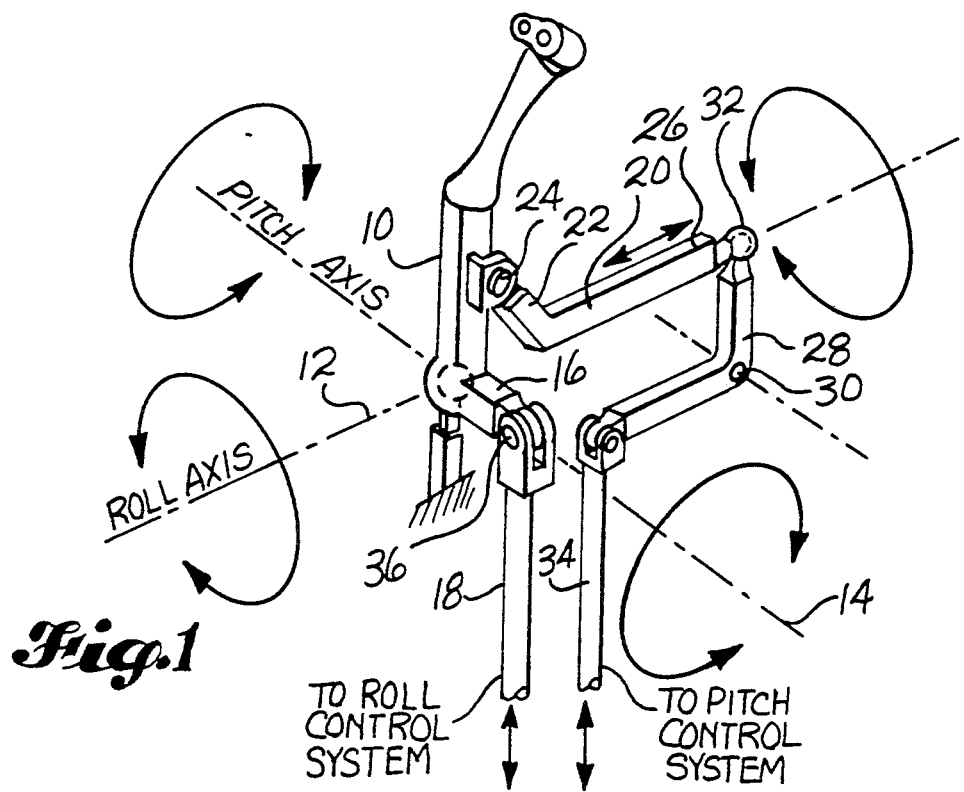
FIG. 1 is an isometric free-space view of essential portions of a first embodiment of the invention.

The present invention may be employed in a variety of embodiments. Two such embodiments are described below and shown in detail in the various views of the drawing. Essential common elements of these embodiments are shown schematically in FIGS. 1 and 2. Each includes a hand-operated control member 10, 10' which is movable to swing about two axes of rotation 12, 14. The axes of rotation 12, 14 may be intersecting, as shown, or could be offset from one another, if desired. The first axis of rotation 12 is the roll axis The second axis of rotation 14 is the pitch axis.

Figure 2:
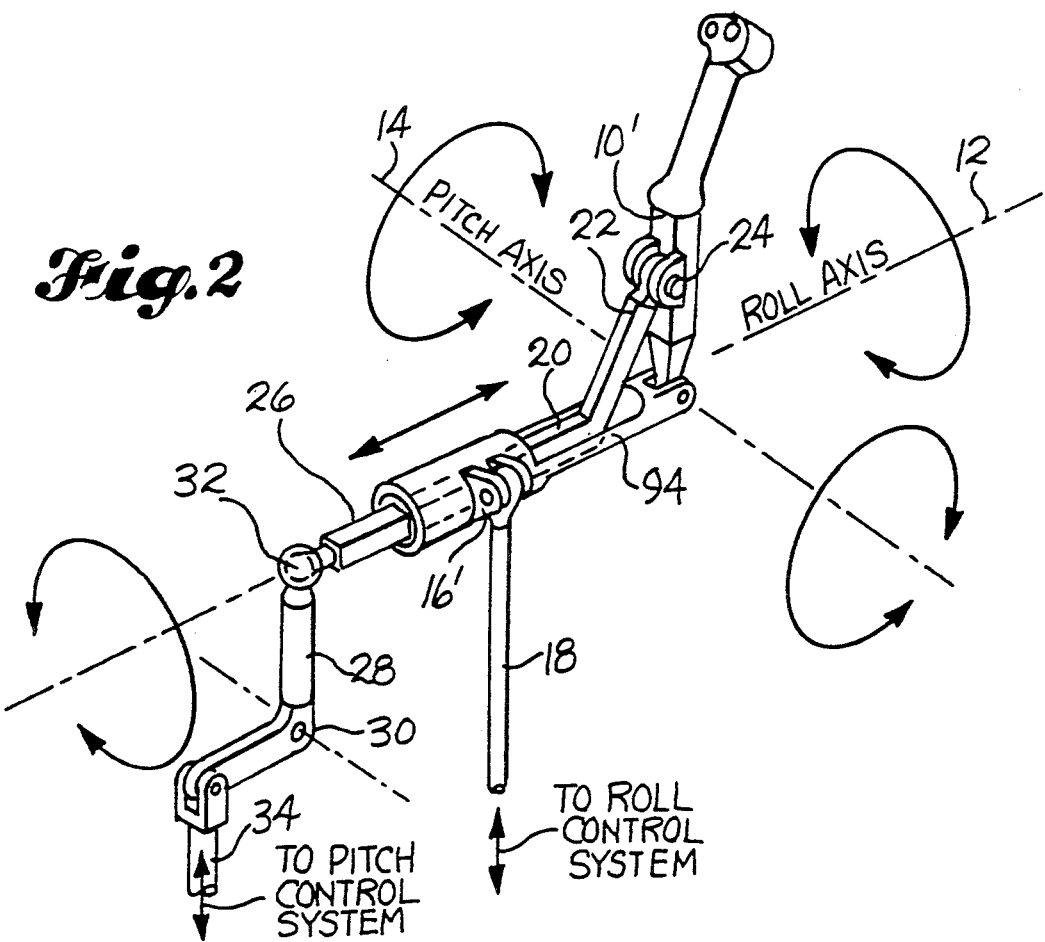
FIG. 2 is an isometric free-space view of essential parts of a second embodiment of the invention.

A lever member 16, 16' is operably connected to the control member 10, 10' such that it moves in response to swinging movement of the control member 10, 10' about the roll axis 12. In each illustrated embodiment, the resulting movement of this lever member 16, 16' effects upward and downward movement of a control rod 18 which operates a roll control sensor. The lever member 16 may be positioned as shown in FIG. 1 to swing through a plane which intersects the second or pitch axis 14. Alternatively, as shown in FIG. 2, the lever member 16' may be positioned in such a manner that it swings through a plane which is offset from, but preferably parallel to, the pitch axis 14.

A reciprocating member 20 has a first portion 22 which is pivotally attached at 24 to the control member 10, 10' at a location spaced from the pitch axis 14. The reciprocating member 20 has an elongated second portion 26 which is axially movable along a line of reciprocation which is substantially co-axial with the roll axis of rotation 12. Movement of the control member 10, 10' to swing about the pitch axis 14 results in linear movement of the second portion 26 of the reciprocating member 20. Movement of the control member 10, 10' about the roll axis results in axial rotation of the second portion 26 of the reciprocating member 20 without any appreciable longitudinal or lateral movement thereof. In order to translate the longitudinal (or horizontal) movement of the reciprocating member 20 into vertical movement for operation of a pitch control sensor, the reciprocating member may be attached to a bell crank or crank arm 28 of any appropriate shape or configuration. The crank arm 28 may be mounted to pivot about a fixed line of rotation 30. The connection between the reciprocating member 20 and the crank arm 28 should be of a universal swivel-type joint 32 such as allows both rotational movement of the reciprocating member 20 which transfers no appreciable movement to the crank arm and pivotal interaction with the crank arm 28 resulting from longitudinal movement of the reciprocating member 20. The crank arm 28 may be connected to a rod 34 which operates a pitch control sensor. The connection between the lever member 16 and control rod 18, at least with respect to the embodiment shown in FIG. 1, should be of a swivel-type joint 36 such as allows free rotational movement of the lever member 16 about the pitch axis 14 without translating any appreciable movement to the control rod 18.

It can be seen in the schematically-illustrated embodiments, that movement of the control member 10, 10' about the roll axis 12 results in a corresponding relative rotational shift of the intersecting pitch axis 14. Although the invention may be constructed in another manner, such a construction causes the roll and pitch axes 12 14 to remain perpendicular to one another at all times and to allow the pitch axis 14 to remain perpendicular to, or at least at a fixed relative angle to, the control member 10, 10' at all times.

First Embodiment

Referring to FIGS. 3, 4 and 5, therein is shown left- and right-hand sidestick controllers according to the first preferred embodiment of the invention. The control member 10 is mounted at the top of a housing tower 38 on a universal pivot, "gimbal-type" mounting or the like to swing about intersecting roll and pitch axes of rotation 12, 14. In preferred form, the housing 38 is positioned immediately outboard of an operator's seat (not shown) at a height appropriate to allow comfortable hand manipulation of the control member 10 and may be mounted to extend upwardly from the flight deck 39. Alternatively, the control member 10 may be mounted in an outboard wall console. The housing 38 normally contains the various control sensors which translate the mechanical movement of the control member 10 into electrical impulses for operation according to the previously-described fly-by-wire system. In preferred form, these sensors are rotary variable differential transformers which are commonly known and function as electrical position sensors. As illustrated, these may include pitch sensors 40, 42 and roll sensors 44, 46. Each of these pitch and roll sensors 40, 42, 44, 46 are separately linked for operation by movement of the control member 10. This duplicative structure provides an increased measure of safety in the event of a failure of a sensor or control linkage.

A viscous damper, also mounted within the housing 38 may be included in the control system, if desired, for pitch 48 and roll 50. These viscous damper mechanisms 48, 50 and provide a smoothness of operation and feel of the control member 10 and may be of any well-known construction.

Each of the pitch control sensors 40, 42 and pitch viscous damper 48 is operably pivotally connected to the crank arm 28 by control linkages 52, 54, 56. Each of the roll sensors 44, 46 and roll viscous damper 50 is operatively pivotally connected to the lever member 16 (not shown in FIGS. 4 and 5) by separate linkages 58, 60, 62.

In order to provide tactile feedback between left- and right-hand controllers, or between pilot and copilot, the control member 10 of each controller may be operably mechanically linked. In preferred form, this is accomplished by bus rods 64, 66 which pass between the left and right control units below the flight deck 39. In this manner, the bus rods 64, 66 pass beneath the pilot and copilot's seats and do not create any obstruction in the cockpit area. Typically, there is adequate available space beneath the cockpit's flight deck 39 such that the bus rods 64, 66 do not interfere with other structure. The mechanical linking is accomplished by operably connecting opposite ends of each bus rod 64, 66 to a crank arm which translates horizontal movement into vertical movement, and vice versa.

Tracing first the pitch control mechanical linkage, from the left-hand controller to the right-hand controller, movement of the control member 10 about the pitch axis 14 causes linear reciprocation of the reciprocating member 20 along a line substantially co-axial with the roll axis 12. The reciprocating member 20 is operably connected at 32 to rotate the crank arm 28 about its fixed axis of rotation 30. This axis of rotation 30 is supported in a fixed position by the housing 38. Relative horizontal reciprocation of the member 20 is translated into relative vertical movement by the crank arm 28. This movement is transferred to a connecting rod 68 which, in turn, is operably connected to a lower crank arm 70. Crank arm 70 is mounted to rotate about a fixed axis 72 relative to the housing 38. The crank arm 70 translates the relative up and down movement of the connecting rod 68 to relative horizontal movement.

This relative horizontal movement is transferred to the pitch system bus rod 64 below the flight deck 39. The pitch system bus rod 64 is operably connected to a second lower crank arm 74 at its opposite end which is mounted to rotate about a fixed axis of rotation 76 and to translate the horizontal movement of the bus rod 64 into relative vertical movement. A right-hand pitch control rod 78 is operably connected to the crank arm 74 to transfer up and down movement to the right-hand upper crank arm 28. This, in turn, operates to horizontally longitudinally reciprocate the right-hand controller's reciprocating member 20 along a line of reciprocation which is substantially co-axial with the roll axis 12 of the right-hand controller. Movement of the reciprocating member 20 causes resulting forward or rearward movement of the right-hand control member 10 about its pitch axis 14. Manipulation of the right-hand control member 10 results, in reverse order, in movement of the left-hand control member 10. As can readily be seen, symmetric movement of both right- and left-hand pitch control sensors 40, 42 is accomplished.

As shown in FIG. 3, the lower crank arms 70, 74 are positioned in similar orientation such that downward movement of the left-hand linkage rod 68 results in downward movement of the right-hand linkage rod 78; upward movement of the left-hand linkage rod 68 results in upward movement of the right-hand linkage rod 78; and vice versa. As detailed in FIG. 7, it can be seen that this will allow forward pivoting of one control member 10 to result in forward pivoting of the other control member 10 and rearward pivoting of one control member 10 to result in rearward pivoting of the other control member 10. Typically, a controller stick will be configured to pivot approximately 20° forward and rearward from a central neutral position. These relative positions can be seen in phantom line in FIG. 7.

Referring now to FIGS. 3, 4, 5 and 6, the left- and right-hand controllers may also be mechanically linked together for translation of swinging movement of the control member 10 about the roll axis 12. As the left-hand control member 10 is rotated inboard or outboard, the lever member 16 is raised or lowered, respectively. This results from the lever member being oriented in a substantially horizontal position relative to the roll axis 12 when the control member 10 is in a neutral roll position. Linking rod 80 (shown in FIG. 4) extends between and is pivotally connected at opposite ends to the lever member 16 and a first lower crank arm 82. The crank arm 82 pivots about a fixed axis of rotation 84 supported by the housing 38. The crank arm 82 translates relative up and down motion of the linking rod 80 into relative horizontal movement of the roll system bus rod 66. The roll system bus rod 66 extends below the cockpit flight deck 39 and is pivotally connected at opposite ends to the first lower crank arm 82 and second lower crank arm 86. The second crank arm 86 is mounted to pivot about a fixed axis of rotation 88 supported by the right-hand housing 38. This crank arm 86 translates the relative horizontal motion of the roll system bus rod 66 into relative up and down movement of the right-hand roll linkage 90. The right-hand roll linkage 90 extends between and is pivotally connected at opposite ends to the crank arm 86 and right-hand lever member 16 of the right-hand control 10. Up and down movement of the roll linkage 90 causes rotation of the lever member 16 about the roll axis 12, resulting in inboard and outboard rotation of the control member 10.

The lower roll crank arms 82, 86 are configured in mirrored symmetry about the longitudinal centerline of the cockpit such that downward movement of the left-hand roll control 80 results in upward movement of the right-hand roll control 90, and vice versa. This allows outboard rotation of the left-hand control member 10 to cause inboard rotation of the right-hand control member 10, and vice versa.

Typically, a controller stick will be configured to pivot approximately 20° to 23° left and right (inboard and outboard) from a central neutral position. These extreme positions can be seen in phantom line in FIG. 6. Symmetric movement of both right- and left-hand sets of roll control sensors 44, 46 is accomplished by movement of either control member 10.

As can be appreciated by a comparison of FIGS. 6 and 7 with FIG. 1, isolation of pitch and roll movements is accomplished by locating the reciprocating member 20 to be axially (longitudinally) movable along a line substantially co-axial with the roll axis 12 in response to swinging movement of the control member 10 around the pitch axis 14. Movement of the control member 10 around the roll axis results only in axial rotation of the reciprocating member 20 without any resulting linear (longitudinal) movement. This allows virtually complete isolation between pitch and roll control movements and allows multiple controllers for a fly-by-wire system to be mechanically linked together to provide tactile feedback of movement of one controller to another. Because each controller includes separate pitch and roll control sensors, it is critical that pitch and roll input movements be isolated and that inputs from multiple mechanically linked together controllers be uniform.

Second Embodiment

FIGS. 2 and 8–13 show a construction of a side stick controller according to the second preferred embodiment of the invention. This embodiment may be configured as shown to allow the control member 10' to be positioned forward of the supporting console or cabinet 38, for example.

The control member 10' is pivotally connected at 92 to support member 94 to swing forwardly and rearwardly about the pitch axis 14. The support member 94 is mounted in the housing 38 with a bearing means 96 for axial rotation. This allows the control member 10' and support member 94 to be rotated about the roll axis 12. Member 20 extends substantially co-axially within the support member 94 and includes an offset portion 22 which is pivotally attached 24 to the control member 10' at a location which is radially spaced from the roll and pitch axes 12, 14. Member 20 is axially slidable within the support member 94 such that forward and rearward swinging rotation of the control member 10' operates to forwardly and rearwardly longitudinally reciprocate member 20 within the support member 94. Rotation of the control member 10' about the roll axis 12 results in concurrent axial rotation of support member 94 and member 20 without creating any longitudinal movement relative to one another.

Figure 9:
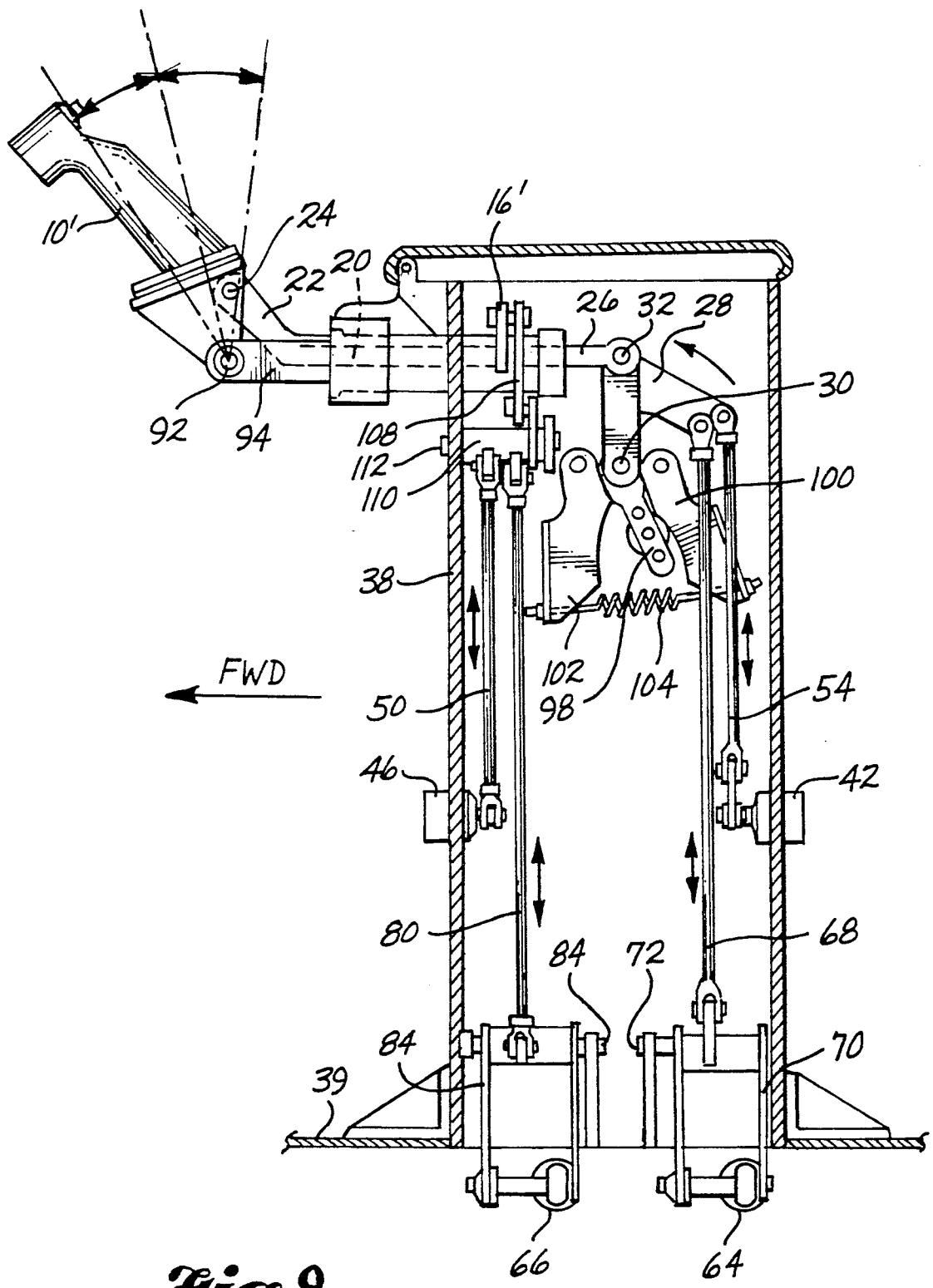
FIG. 9 is a side view of the side stick controller console with the control stick in a forwardly-pitched condition.
Figure 10:
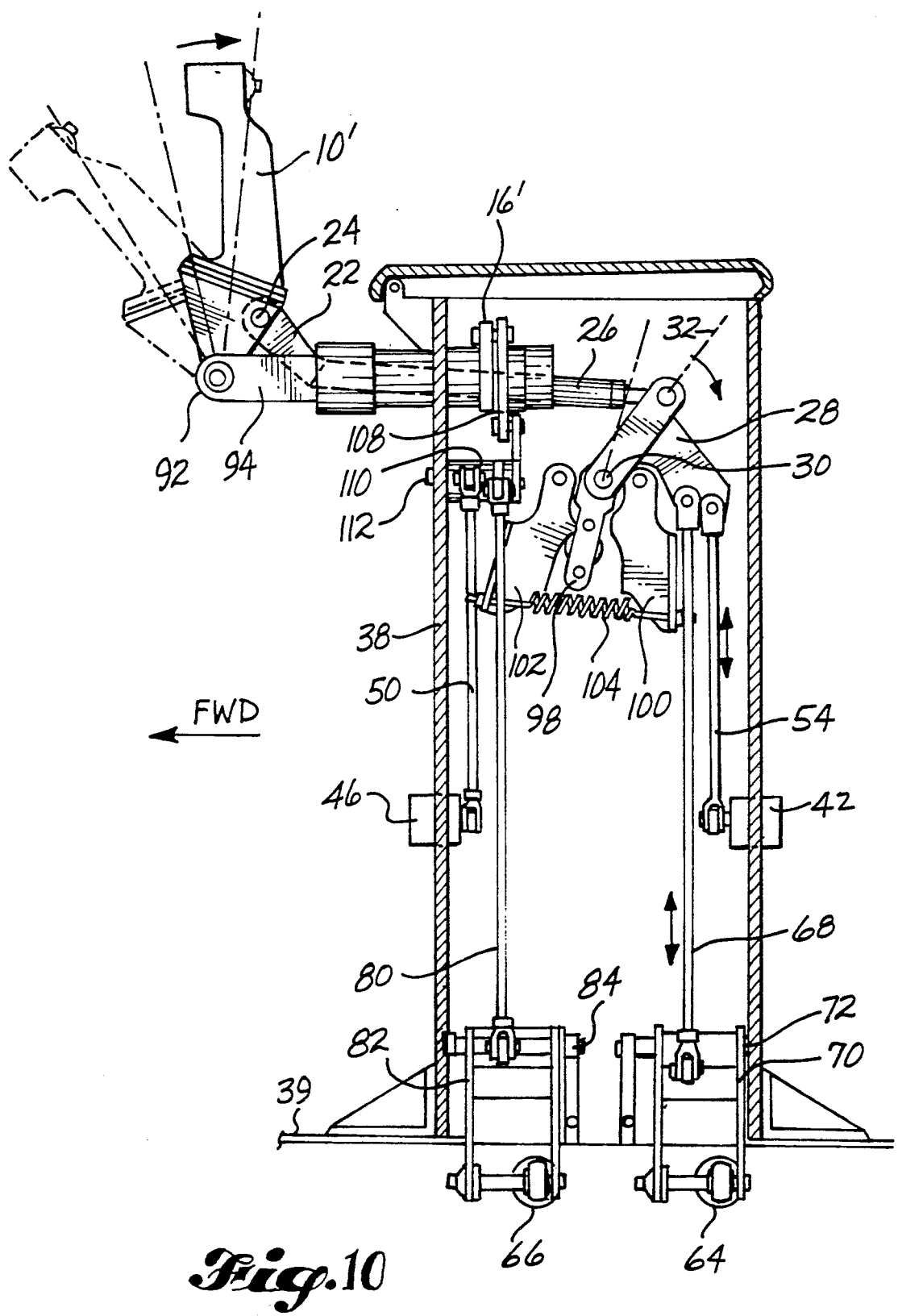
FIG. 10 is a view similar to that shown in FIG. 9, except with the control stick in a rearwardly-pitched position.
Figure 11:
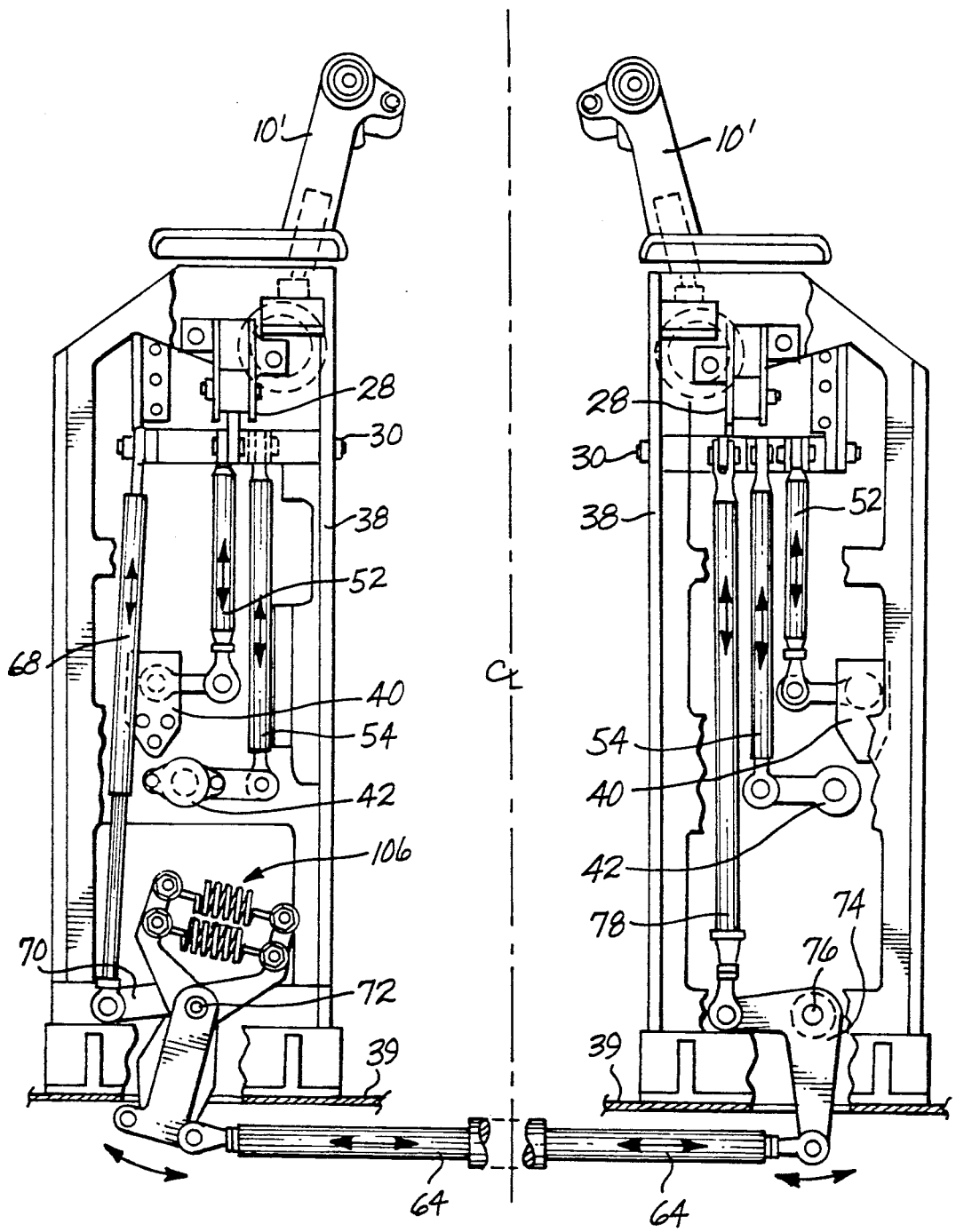
FIG. 11 is a rear cut-away view of left and right side stick controllers showing the mechanical linkage of the pitch control.

The control member 10' is typically mounted to pivot forwardly and rearwardly approximately 20° from a central neutral position (shown in phantom lines). As described above, movement of the control member 10' about the pitch axis 14 results in longitudinal reciprocation of member 20. The rear, longitudinal portion 26 of member 20 is attached for universal pivotal connection 32 to crank arm 28. Crank arm 28 is supported by the housing 38 to rotate about a fixed pivot 30. The crank arm 38 translates the relative horizontal movement of the member 20 into relative vertical movement for operation of control sensors and mechanical linkage to an associated side stick controller as described above with respect to the first preferred embodiment. Referring now also to FIGS. 9, 10 and 11, it can be seen that swinging movement of one control member 10' about the pitch axis 14 causes similar movement of the other controller's control member 10' and operation of the pitch control sensors 40, 42 in each controller housing 38.

Referring to FIG. 9, when the control member 10' is rotated forwardly about the pitch axis 14, the reciprocating member 20 is moved axially within the support member 94 in a forward direction. This causes the crank arm 28 to rotate forwardly about its fixed axis of rotation 30, lifting the attached control rod members 52, 54, 68. This rotation of the crank arm 28 causes a similar rotation of the crank arm lever 98, also about fixed axis 30. The crank arm lever 98 is positioned between first and second centering levers 100, 102. The centering levers 100, 102 are pivotally mounted to be deflected in response to movement of the crank arm lever 98 and are spring biased 104 toward one another to a neutral position. This mechanism of spring biased centering levers 100, 102 provide a resistance or "feel" to the control member 10'. This mechanism will also tend to return the control member 10' to a centered neutral position when released by the operator. Because the left- and right-hand controllers are mechanically linked to one another and because each controller includes such a centering mechanism, each mechanism provides fifty percent of the total feel or resistance on the control member 10'. Structural variations of this type of centering and resistance mechanism are well known and in common use. A centering and resistance mechanism of this or another type may also be used with the above-described first embodiment. The resistance and centering mechanism need not act on the crank arm 28 directly, but may be operably positioned at any point in the mechanical controller system. A centering and resistance mechanism may similarly be used in the roll control system of either disclosed embodiment.

Referring now to FIG. 10, therein the control member 10' is shown displaced in an extreme rearward or "pitch up" position. In this position, the reciprocating member 20 is moved horizontally rearwardly within the support member 94. This causes a rotational displacement of the crank arm 28 about the fixed axis 30, as indicated by the movement arrow. The crank arm lever 98 is rotated against the other centering lever 102, expanding spring 104.

Referring specifically to FIG. 11, therein can be seen the mechanical pitch linkage between left- and right-hand controllers. Movement of the left-hand control member 10' about the pitch axis causes rotational movement of crank arm 28 about its axis 30, as described above. This results in up or down movement of linkage 68 which is connected at its lower end to a lower crank arm 70. Lower crank arm 70 rotates about its fixed axis 72 and results in horizontal movement of the pitch bus rod 64. The pitch bus rod 64 is pivotally connected at opposite ends between the left-hand lower crank arm 70 and right-hand lower crank arm 74. The right-hand lower crank arm 74 pivots about its fixed axis 76 to translate horizontal movement into vertical movement.

A right-hand linkage 78 connects the right-hand lower crank arm 74 with the right-hand controller crank arm 28. Movement of the right-hand controller crank arm 28 results in complementary movement of the right-hand control member 10' in the previously-described manner. Movement of both left- and right-hand crank arms 28 operates the previously-described rotary variable differential transformer-type pitch control sensors 40, 42 by movement of linkage rods 52, 54.

As shown in FIG. 11, the mechanical linkage between left-hand and right-hand controllers may include an override mechanism 106. Such an override mechanism may be included in the above-described first preferred embodiment of the invention and may be any of the well-known types of an override mechanism. The exact type of override mechanism chosen is not essential to the present invention. For example, the mechanism 106 may include one or more springs having sufficient force such that there is no noticeable loss of movement in the operation of the lower crank arm 70. In the event that one controller or the connecting bus rod 64 becomes mechanically stuck or inoperable, the other controller may still be used to operate the control sensors 40, 42 by exerting sufficient overriding force on the operable control member 10' to overcome the resisting spring force of the mechanism 106.

Referring now to FIGS. 8, 12, 13, and 14, therein can be seen the roll control mechanism of this second preferred embodiment of the invention. Side-to-side swinging of the control member 10' about the roll axis 12 results in swinging movement of the lever member 16'. The lever member 16' is connected by a pivotal linkage 108 to a three-lever crank arm or rocker member 110. The rocker member 110 is supported by the housing 38 for pivotal movement about a fixed pivot 112. The rocker member 112 has lever portions extending opposite one another on each side of the pivot 112 and includes a downwardly-extending lever portion 114. The downwardly-extending portion 114 carries a roller for bearing against first and second centering levers 116, 118 which are spring biased 120 together toward a central, neutral position. These members 116, 118, 120 create a centering and resistance mechanism for the roll system which is substantially similar in operation to the above-described centering and resistance mechanism for the pitch system.

Figure 12:
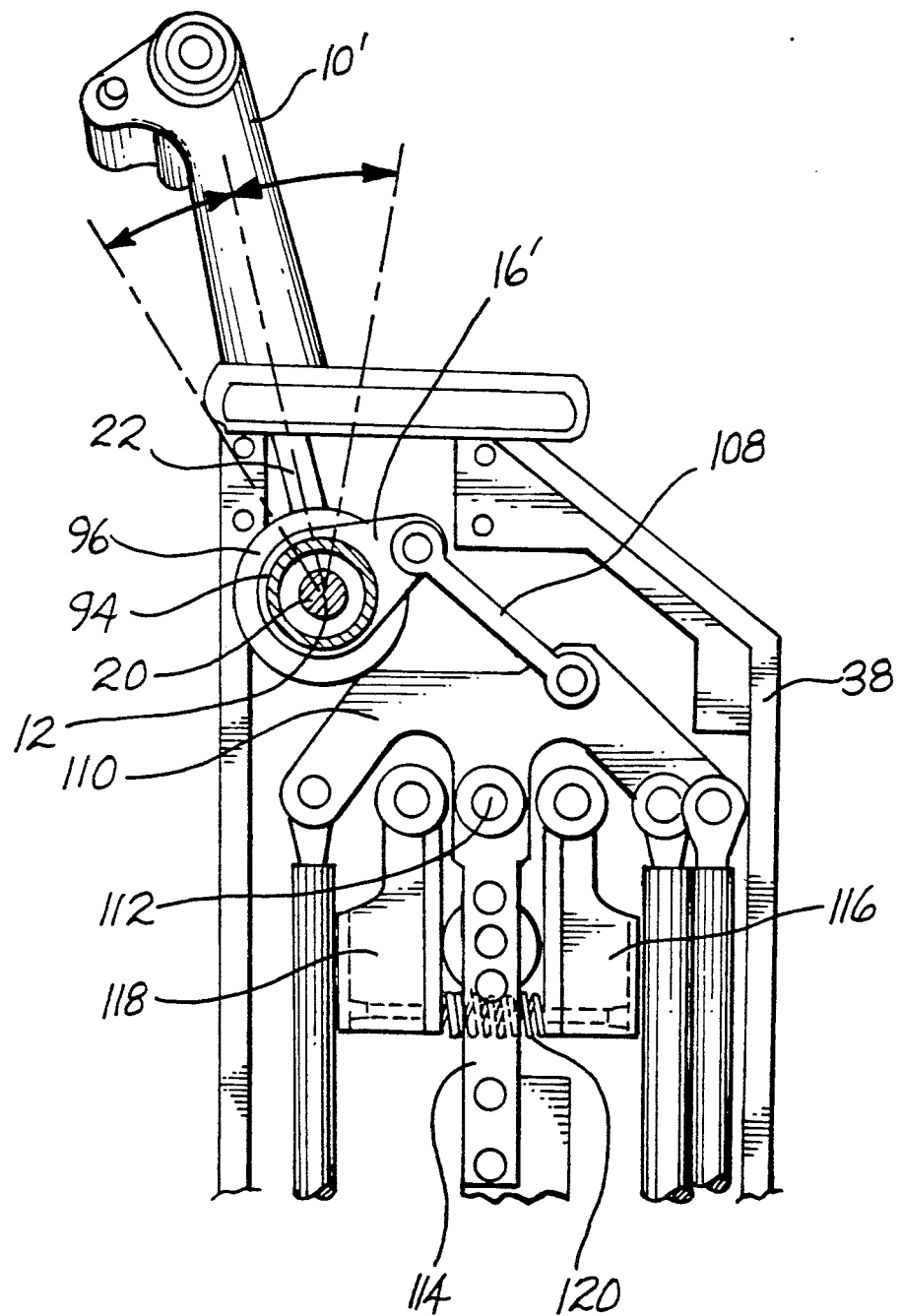
FIG. 12 is an enlarged detail view of the right-hand stick control taken substantially along line 12—12 of FIG. 8 showing roll control.
Figure 13:
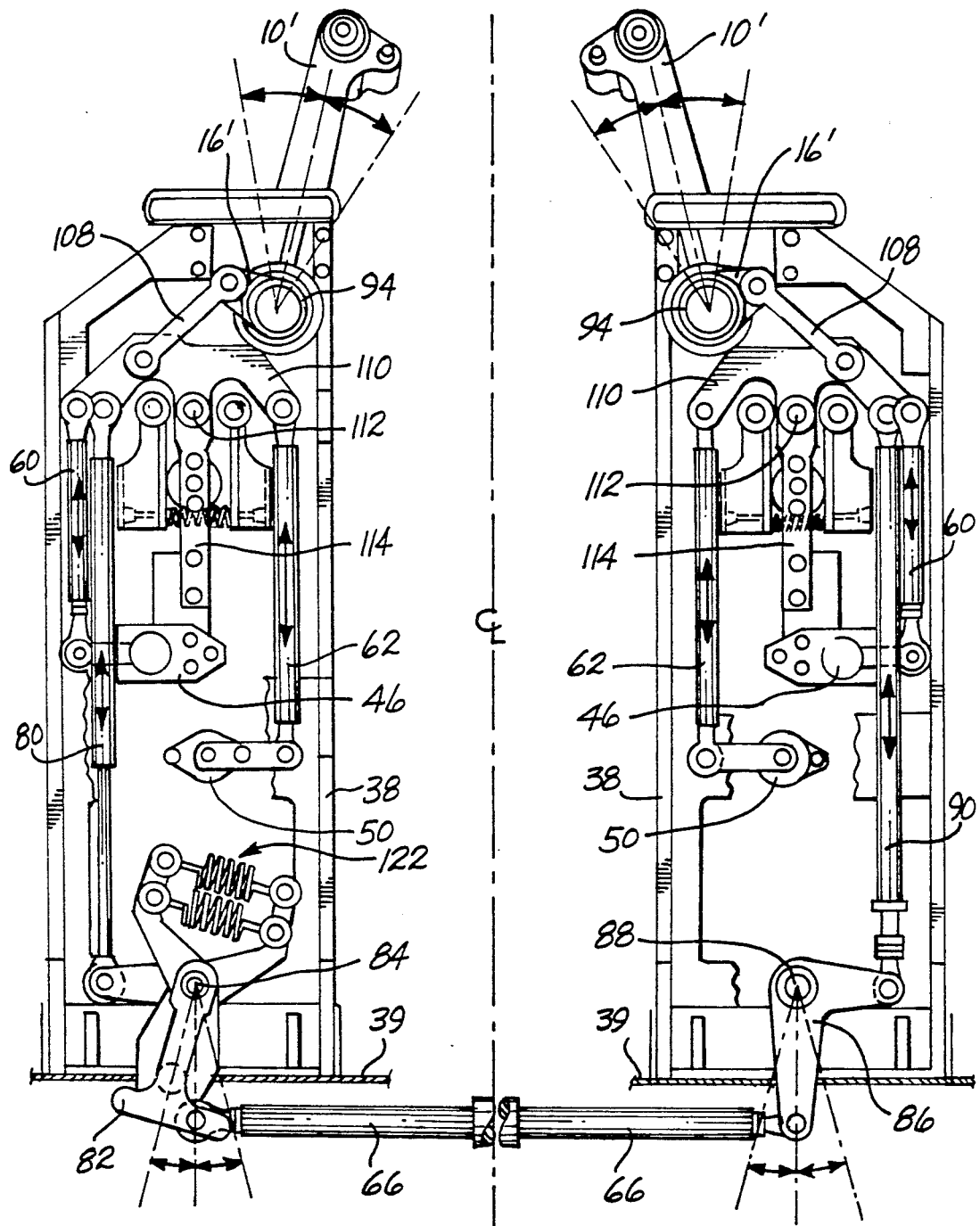
FIG. 13 is a rear out-away view of left and right side stick controllers showing the mechanical linkage of the roll controls.
Figure 14:
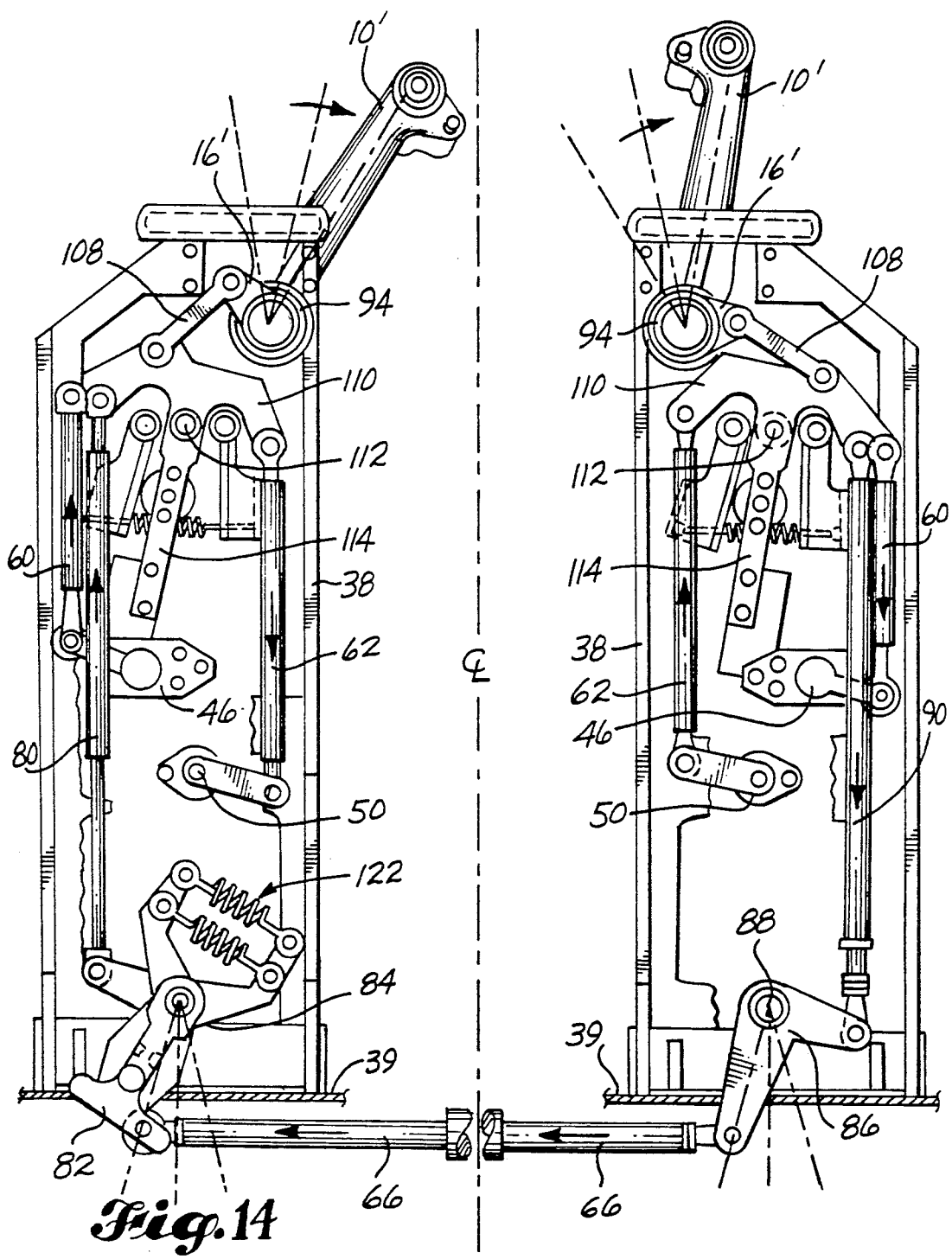
FIG. 14 is a view similar to FIG. 13 in which the side stick controllers are moved into a right roll position.

Referring now to FIGS. 12, 13 and 14, and specifically to a comparison between FIGS. 13 and 14, therein it can be seen how movement of one control member 10' in an inboard direction is mechanically linked with a second controller to cause outboard rotation of the second control member 10' and operation of the roll control sensors 46. When the left-hand control member 10' is moved from a neutral position, as shown in FIG. 13, to an inboard or right-hand roll position, as shown in FIG. 14, roll control sensors 46 are operated and the right-hand control member 10' is correspondingly moved in the following manner. Right-hand roll of the control member 10' rotatingly lifts the lever member 16 and, through pivotal linkage 108, tips rocker member 110 on its pivot 112. Movement of the rocker member 110 may be damped by a commonly-known rotary damper 50 which functions in the manner previously described with respect to the first preferred embodiment of the invention. Tilting of the rocker member as shown in FIG. 14 results in an upward movement of control linkages 60, 80 which are operably attached to one or more roll sensors 46 and a lower crank arm 82.

As previously described, the lower crank arm may include an override mechanism 122 of any well-known construction. Rotation of the lower crank arm 82 causes lateral horizontal movement of roll bus rod 66, as shown by movement arrows. Roll bus rod 66 is pivotally connected at opposite ends between the left lower crank arm 82 and right lower crank arm 86. Rotation of the right lower crank arm 86 about its fixed axis 88 causes downward movement of control linkage 90. This, in turn, causes tipping of the right-hand rocker member 110 comparable to that of the left-hand controller. Movement of the rocker member 110 about its fixed pivot 112 causes operation of the right-hand roll control sensor 46 and right-hand control member 10'.

Left-hand roll control movement is manifested in a similar manner by substantially opposite movements of each of the above-described members. Of course, manipulation of the right-hand control member 10' will effect similar operation of the left-hand controller.

The above preferred embodiments have been described in detail for the purpose of example only. The pitch and roll control-isolating mechanism of the present invention may be practiced in many other forms and in combination with other structure. The present invention may be utilized in virtually any fly-by-wire aircraft, as well as any such flight simulator. Many changes could be made in the use of this invention as necessary to serve a particular application without departing from the spirit and scope of this invention. Therefore, these examples are not to be construed as limitive in any nature. Patent rights are to be determined by the limitations of the following claim or claims interpreted according to accepted doctrines of claim interpretation, including the doctrine of equivalents.

What is claimed is:

1. Mechanically-linked control stick mechanisms for isolating movement in two axes, comprising:
   first and second control stick mechanisms, each comprising:
      a hand-operated control member movable to swing about two axes of rotation;
      a first lever member on said control member which moves in response to swinging movement of said control member about the first axis of rotation; and
      a reciprocating member having a first portion pivotally attached to said control member at a location spaced from the second axis of rotation and having an elongated second portion longitudinally movable along a line of reciprocation substantially coaxial with said first axis of rotation in response to swinging movement of said control member about the second axis of rotation;
   wherein movement of each said first lever member effecting operation of a separate first control sensor and movement of each said reciprocating member effecting operation of a separate second control sensor, each said control sensor including means for translating mechanical motion into an electrical signal; and
   mechanical linkage between said first and second control stick mechanisms for transferring movement of the control member of one mechanism to the control member of the other, said mechanical linkage including override means for allowing movement of either one of said first and second control stick mechanisms and its separate control sensors in the even that the other control stick mechanism is mechanically stuck or inoperable.

2. The mechanism of claim 1, wherein said mechanical linkage includes a plurality of connecting rods and crank arms for communication of said motion between said control stick mechanisms.

* * * * *

UNITED STATES PATENT AND TRADEMARK OFFICE
CERTIFICATE OF CORRECTION

PATENT NO. : 5,149,023
DATED : September 22, 1992
INVENTOR(S) : Seiya Sakurai, Dieter W Hoener and Erwin Schweizer It is certified that error appears in the above-indentified patent and that said Letters Patent is hereby corrected as shown below:

Title page, under "[75] Inventors:", "Dieter W." should be -- Dieter W --.
Title page, under "References Cited, U.S. PATENT DOCUMENTS", the following patents were omitted:

| | | |
|---|---|---|
| 1,246,010 | 11/1917 | Burgess |
| 1,331,628 | 2/1920 | Dusuzeau |
| 1,601,337 | 9/1926 | Avery |
| 1,845,953 | 2/1932 | Barry |
| 2,162,150 | 6/1939 | Wolf |
| 2,339,955 | 1/1944 | Shetler |
| 3,011,739 | 12/1961 | Boyce et al. |
| 3,350,956 | 11/1967 | Monge |
| 3,523,665 | 8/1970 | Laynor Jr. et al. |
| 3,604,664 | 9/1971 | Mahoney |
| 3,651,709 | 3/1972 | Booty et al. |
| 3,726,497 | 4/1973 | Gannett et al. |
| 4,403,756 | 9/1983 | Berlin et al. |
| 4,473,203 | 9/1984 | Barnoin et al. |
| 4,531,080 | 7/1985 | Nordstrom |

UNITED STATES PATENT AND TRADEMARK OFFICE
CERTIFICATE OF CORRECTION

PATENT NO. : 5,149,023
DATED : September 22, 1992
INVENTOR(S) : Seiya Sakurai, Dieter W Hoener and Erwin Schweizer It is certified that error appears in the above-indentified patent and that said Letters Patent is hereby corrected as shown below:

```
   Title page, under "References Cited, FOREIGN PATENT DOCUMENTS",
     the following patents were omitted:
     2,558,136      7/1985     France
       204,598     12/1986     Europe
Col. 2, line 56, "out-away" should be -- cut-away --.
Col. 3, line 5, there is a period after "axis".
Col. 3, line 60, there is a comma after "axes 12".
Claim 1, col. 10, line 2, delete the period after "two"; and
     in line 32, "even" should be -- event --.
```

Signed and Sealed this

Fourteenth Day of December, 1993

*Attest:*

BRUCE LEHMAN

*Attesting Officer*   *Commissioner of Patents and Trademarks*